UNITED STATES PATENT OFFICE.

JULIUS RHEINBERG, OF LONDON, ENGLAND.

LIGHT-SENSITIVE COLLODION COATING MIXTURE AND FILM.

1,396,592.  Specification of Letters Patent.  Patented Nov. 8, 1921.

No Drawing.  Application filed October 11, 1920.  Serial No. 416,313.

*To all whom it may concern:*

Be it known that I, JULIUS RHEINBERG, a subject of the King of Great Britain, residing at London, England, have invented new and useful Improvements in Light-Sensitive Collodion Coating Mixtures and Films, of which the following is a specification.

Collodion, as is well known, is the term employed to designate a solution of pyroxylin or of one of the many forms of soluble gun cotton, for example celloidin, and such a solution when poured or spread on a glass plate or other material forms a dry film. The properties of this film depend as much on the solvent employed in the collodion as on the particular form of gun cotton dissolved. Water cannot be used as the solvent in collodion, but a number of other solvents are available. For photographic purposes the solvent hitherto employed has almost invariably been a mixture of ether and ethyl alcohol, neither of these alone being capable of dissolving the pyroxylin or gun cotton; and the salts used for producing light sensitiveness in collodion mixtures for photographic purposes or collodion films have almost invariably been inorganic salts, notably the chlorids, bromids and iodids of silver or of other metals, singly or in combination.

Organic salts, for example the organic iron salts, which have frequently been employed in water soluble light sensitive coating mixtures, such as solutions of gelatin or other water soluble colloids, have not so far as I am aware, found employment in collodion because it has not hitherto been found possible to introduce them into collodion. Now, I have discovered that collodion in which the solvent employed consists entirely or mainly of methyl alcohol enables me to introduce organic iron salts in the coating mixture or emulsion, whereby I obtain light sensitive films which have distinctive properties. Moreover such coating mixtures or emulsions have other advantages, among which may be named that the mixtures flow more readily and easily than the ordinary collodion coating mixtures, and are far less liable to accumulate dust or specks than are water soluble coating mixtures.

According to my invention therefore I prepare a collodion coating mixture or emulsion for photographic purposes by making up collodion with methyl alcohol as the solvent, to which I may, however, add either at the time of preparing the collodion or subsequently a proportion of some other solvent, for example ethyl alcohol. The latter has the property of lessening the porosity, and increasing the density and clearness of the collodion film, which can be controlled and regulated by the amount of ethyl alcohol in the coating mixture. The most useful results are obtained when the proportion of ethyl alcohol to methyl alcohol in the finished coating mixture is as 1:3 or 1:4. A trifling proportion, not exceeding 2 or 3%, of water, will on the other hand increase the porosity of the collodion film, and can be added to the collodion mixture, if desired.

I further prepare a solution of the organic iron salt and add it to the collodion. The salt I prefer to use is ferric ammonium citrate, and the preferred solvent is methyl alcohol. If the salt, as in the case of ferric ammonium citrate, is not completely soluble in the methyl alcohol then only the soluble portion is decanted and used in the mixture.

The mixture so prepared produces a light sensitive film when coated on glass plates or other material, but in order to increase its sensitiveness I may bathe the plates in an alcoholic solution of other metallic salts, such as silver, gold, platinum or palladium salts, either singly or in combination. Some salts suitable for the purpose are silver nitrate, gold chlorid, platinum chlorid, or palladium chlorid. I prefer, however in place of bathing the plates, to add the salts for obtaining increased light sensitiveness to the admixture itself, preferably dissolving them in ethyl alcohol. The ethyl alcohol so used may be made to serve the double purpose of dissolving the added salt and of producing the desired degree of density of the collodion film, as referred to above.

A typical light sensitive collodion coating mixture or emulsion would be composed as follows:—

6% celloidin dissolved in methyl alcohol, 2 parts by vol.;

Ferric ammonium citrate saturated solution in methyl alcohol, 1 part by vol.;

2% silver nitrate in ethyl alcohol (industrial spirits), 1 part by vol.

What I claim is:

1. A light sensitive coating mixture comprising soluble gun cotton dissolved in methyl alcohol, and an organic ferric salt.

2. A light sensitive coating mixture comprising soluble gun cotton dissolved in methyl alcohol, ethyl alcohol, and an organic ferric salt.

3. A light sensitive coating mixture comprising soluble gun cotton dissolved in methyl alcohol, and ferric ammonium citrate.

4. A light sensitive coating mixture comprising soluble gun cotton dissolved in methyl alcohol, ethyl alcohol, and ferric ammonium citrate.

5. A light sensitive coating mixture comprising soluble gun cotton dissolved in methyl alcohol, an organic ferric salt, and an alcoholic solution of a silver salt.

6. A light sensitive coating mixture comprising soluble gun cotton dissolved in methyl alcohol, an organic ferric salt, and an alcoholic solution of a salt of a precious metal.

7. A light sensitive coating mixture comprising soluble gun cotton dissolved in methyl alcohol, ethyl alcohol, an organic ferric salt, and an alcoholic solution of a silver salt.

JULIUS RHEINBERG.

Witnesses:
GEORGE HARRISON,
HERBERT A. BEESTON.